United States Patent Office 3,459,705
Patented Aug. 5, 1969

3,459,705
STABILIZED POLYOLEFINS WITH (1) A THIOBIS COMPOUND AND (2) AN ORGANIC ANTIMONYL COMPOUND
Otto Mauz, Niederhofheim, Taunus, Germany, assignor to Farbwerke Hoechst Aktiengesellschaft vormals Meister Lucius & Bruning, Frankfurt am Main, Germany, a corporation of Germany
No Drawing. Filed Dec. 16, 1966, Ser. No. 602,169
Claims priority, application Germany, Dec. 21, 1965,
F 47,977
Int. Cl. C08f 45/62, 45/58
U.S. Cl. 260—45.75
4 Claims

ABSTRACT OF THE DISCLOSURE

Homo- and copolymers of olefins stabilized against degradation caused by light and heat containing 0.005 to 5% by weight, referred to the polymer, of a mixture of (a) a compound of the formula

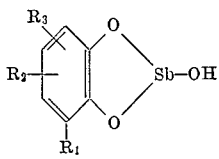

and 0.005 to 5% by weight of (b) a sulfur compound of the formula

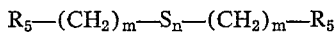

wherein $R_1$ is hydrogen, chlorine, bromine or hydroxyl, $R_2$ is hydrogen, alkyl having from 1 to 18 carbon atoms or halogen, $R_3$ is hydrogen, alkyl having from 1 to 5 carbon atoms of —COO.$R_4$, $R_4$ representing an aliphatic radical containing from 1 to 20 carbon atoms, $n$ is a whole number from 1 to 4, $m$ is a whole number from 1 to 19, $R_5$ is $CH_3$— or —COO.$R_6$, $R_6$ representing alkyl having from 1 to 18 carbon atoms and wherein the ratio of the components (a) and (b) to one another is from 1:9 to 9:1.

The present invention provides a stabilized mixture of polyolefins and a process for preparing it.

The action of atmospheric oxygen on polyolefins causes their oxidative degradation that is considerably accelerated at elevated temperatures or in the presence of light. This degradation very adversely affects the mechanical properties of shaped articles made from polyolefins, for example their ultimate tensile strength, their elasticity and their toughness and thus their service durability.

In order to avoid or retard this degradation, it has already been proposed to use organic compounds, for example aromatic amines and phenols, as stabilizers in polyolefins. Most stabilizers, however, have various disadvantages which, under certain circumstances, considerably restrict their use. Generally, compounds of the class of the aromatic amines, for example 4.4′-diamino-diphenyl amine or phenyl-β-naphthyl amine derivatives, are very good stabilizers, but they have the great disadvantage of being strongly discolored and, in most cases, more or less toxic. As to their stabilizing effect, phenol derivatives are inferior to aromatic amines and also tend to discoloration in the presence of air and light, owing to their easy conversion into quinoid structures.

I have now found that homo- and copolymers of olefins can be stabilized against the degradation caused by light and heat, by using as stabilizers 0.005 to 5% by weight, referred to the polymer, of a mixture of a compound of the general Formula a (a)

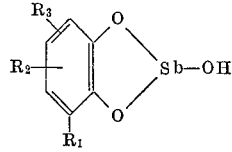

and 0.005 to 5% by weight of a sulfur compound of the general formula (b)     $R_5$—$(CH_2)_m$—$S_n$—$(CH_2)_m$—$R_5$ in which Formula a, $R_1$ represents a hydrogen, chlorine or bromine atom or an —OH-group, preferably an OH-group, $R_2$ represents hydrogen, an alkyl group having from 1 to 18, preferably 4 to 9 carbon atoms, or a halogen atom, $R_3$ represents a hydrogen atom, an alkyl group having from 1 to 5 carbon atoms, preferably the tert.-butyl group, or the group —COO.$R_4$, $R_4$ representing an aliphatic radical containing from 1 to 20, preferably 12 to 18 carbon atoms, and in which Formula b, $n$ represents a whole number from 1 to 4, $m$ represents a whole number from 1 to 19, preferably 1 to 4, $R_5$ represents a $CH_3$— or —COO.$R_6$ group and $R_6$ represents an alkyl radical having from 1 to 18, preferably 12 to 18 carbon atoms and wherein the mixing ratio of the components (a) and (b) to one another may range from 1:9 to 9:1.

Although the antimony compounds of Formula a used as one component of the stabilizer combination according to the invention, as well as the sulfur compounds of Formula b have partially only a small stabilizing effect, the combination of (a) and (b) surprisingly have an excellent stabilizing action.

Compared with the known phenolic stabilizers, the antimony compounds of Formula a used according to the invention have the particular advantage of a high thermostability. The antimony compounds have no melting point, but they are only decomposed, in general, at temperatures exceeding 270° C. At the high temperatures applied for processing polyolefins, they therefore have no unpleasant smell and do not show a discoloration, in contrast to the known phenolic stabilizers which discolor the polymer on account of their transition into the quinoid state.

Another great advantage is the insolubility of the antimony compounds in water and, some of them, in organic solvents. This type of stabilizer is therefore particularly suitable for stabilizing plastic materials which get into contact with water or organic solvents, for example lost bottles containing milk, oils and the like, household goods, washing machines, parts of dish washing machines coming into contact with washing liquors, hot water pipes, fibers and polyolefin plastics for outdoor use.

As polyolefins to be stabilized according to the invention there are mentioned polyolefins which contain tertiary carbon atoms, preferably polypropylene and polybutylene. It is also possible, according to the invention, to stabilize polyolefins, such as high-pressure polyethylene or low-pressure polyethylene, which contain side chains due to side reactions.

The antimony compounds used as the stabilizing component (a) according to the invention can be prepared by reacting polyphenols, for example pyrocatechol, alkylpyrocatechol, chloropyrocatechol, pyrogallol, alkylpyrogallol or gallic acid esters, with potassium antimonyltartrate in boiling water. In some cases, it is also advantageous to react the polyphenols with antimony(III)chloride.

As compounds of type (a) there are particularly used according to the invention:

2-hydroxy-4,5-benzo-1,3,2-dioxastibenol
2-hydroxy-4,5-benzo-8-tert.butyl-1,3,2-dioxastibenol
2-hydroxy-4,5-benzo-6,8-di-tert-butyl-1,3,2-dioxastibenol
2-hydroxy-4,5-benzo-8-chloro-1,3,2-dioxastibenol
2-hydroxy-4,5-benzo-6-hydroxy-1,3,2-dioxastibenol
2-hydroxy-4,5-benzo-7,9-di-tert.butyl-1,3,2-dioxastibenol
2-hydroxy-4,5-benzo-6-hydroxy-8-carboxypropyl-1,3,2-dioxastibenol
2-hydroxy-4,5-benzo-6-hydroxy-8-carboxydodecyl-1,3,2-dioxastibenol Among these compounds there are preferred the following:

2-hydroxy-4,5-benzo-1,3,2-dioxastibenol
2-hydroxy-4,5-benzo-6-hydroxy-1,3,2-dioxastibenol
2-hydroxy-4,5-benzo-6-hydroxy-8-carboxydodecyl-1,3,2-dioxastibenol As sulfur compounds (b) used according to the invention there may in particular be mentioned the following:

di-(octadecyl)-tetrasulfide
di-(octadecyl)-sulfide
di-(dodecyl)-disulfide
di-(octadecyl)-disulfide
di-(octadecyl)-trisulfide
di-(dodecyl)-tetrasulfide
thio-di-(acetic acid dodecyl ester)
thio-di-(propionic acid dodecyl ester)
thio-di-(propionic acid octadecyl ester)
thio-di-(undecylic acid butyl ester)
dithio-di-(acetic acid dodecyl ester)
dithio-di-(propionic acid octyl ester)
dithio-di-(propionic acid dodecyl ester)
dithio-di-(propionic acid octadecyl ester)
dithio-di-(butyric acid dodecyl ester)
dithio-di-(undecyclic acid butyl ester)
trithio-di-(acetic acid dodecyl ester)
trithio-di-(propionic acid dodecyl ester)
tetrathio-di-(acetic acid dodecyl ester)
tetrathio-di-(acetic acid octadecyl ester)
tetrathio-di-(butyric acid octyl ester)

Among these components there are preferred:

di-(octadecyl)-tetrasulfide
di-(octadecyl)-disulfide
di-(dodecyl)-tetrasulfide
thio-di-(propionic acid dodecyl ester)
thio-di-(propionic acid octadecyl ester)
dithio-di-(acetic acid dodecyl ester)

The stabilizer is mixed into the polyolefin to be stabilized either by stirring the solid antimony compound which is insoluble in organic solvents into the polyolefin powder or by mixing a large amount of stabilizer with a small amount of polyolefin. For the latter purpose, a concentrated solution of the stabilizer in a low-boiling solvent, for example acetone or methylene chloride, is mixed with a small amount of the pulverulent polymerization product to be stabilized in such a ratio that the mixture contains about 30 to 40% by weight of stabilizer after the solvent has been evaporated.

According to this method, there is obtained a dry powder that can be incorporated in known manner into the polymer to be stabilized, to yield the desired concentration of stabilizer in the finished mass. The stabilizer can, of course, also be incorporated while the polymerization products are being prepared or worked up. This working method has the particular advantage of protecting the polymer against light and oxygen, in particular at elevated temperatures, already at an early stage, i.e. still during the preparation or work up.

It is also possible to incorporate the stabilizer together with other known age-resisters, pigments or usual additives into the polyolefins for an easier processing.

The polyolefins stabilized according to the invention can be processed into shaped articles according to known molding methods, for example by compression molding, injection molding and extrusion molding.

The following examples serve to illustrate the invention, but they are not intended to limit it thereto.

Examples

A 1%-acetonic solution of the stabilizers or mixtures of stabilizers mentioned in the following tables was mixed with polypropylene powder in such a proportion that the stabilizer concentration calculated on the polypropylene amounted to 0.5% by weight. The stabilized polypropylene powder was dried in vacuo at 50° C. and then molded into round plates of a thickness of 1 mm. and a diameter of 120 mm. Some of the compounds, for example 2-hydroxy-4,5-benzo-1,3,2-dioxastibenol and 2-hydroxy-4,5-benzo-6-hydroxyl-1,3,2-dioxastibenol were completely insoluble in the usual organic solvents and had therefore to be incorporated in a solid state.

Molding conditions: temperature 200° C., a contact pressure ranging from 5 to 10 atmospheres for 10 minutes, a molding pressure of 100 atmospheres for 2 minutes.

Several test strips of a breadth of 10 mm. and a length of 100 mm. each were punched from every plate, hung up freely in a drying chamber and tempered at 140° C. under access of air. As a measure for their thermostability was determined the period of embrittlement. By this period was understood the period, measured in days, after which the test strips stored at 140° C. broke on having been bent by 180°, or started decomposing in a special pulverulent form which is typical of polypropylene.

The following tables comprise the test results:

TABLE I—COMPARATIVE TESTS

| Test No. | Stabilizers | Concentration in percent by weight | Period of embrittlement in days at 140° C. |
|---|---|---|---|
| 1 | Di-(octadecyl)-disulfide | 0.5 | 2 |
| 2 | Di-(octadecyl)-tetrasulfide | 0.5 | 7 |
| 3 | Thio-di-(propionic acid-lauryl-ester) | 0.5 | 2 |
| 4 | Dithio-di-(acetic acid-octadecyl-ester) | 0.5 | 2 |
| 5 | Dithio-di-(undecylic acid-butyl-ester) | 0.5 | 3 |
| 6 | Trithio-di-(acetic acid-octadecyl-ester) | 0.5 | 5 |
| 7 | Tetrathio-di-(acetic acid-dodecylester) | 0.5 | 7 |
| 8 | 2-hydroxy-4,5-benzo-1,3,2-dioxastibenol | 0.5 | 1 |
| 9 | 2-hydroxy-4,5-benzo-8-tert.-butyl-1,3,2-dioxastibenol | 0.5 | 1 |
| 10 | 2-hydroxy-4,5-benzo-6-hydroxy-1,3,2-dioxastibenol | 0.5 | 1 |
| 11 | 2-hydroxy-4,5-benzo-6-hydroxy-8-tert-butyl-1,3,2-dioxastibenol | 0.5 | 2 |
| 12 | 2-hydroxy-4,5-benzo-6-hydroxy-8-carboxydodecyl-1,3,2-dioxastibenol | 0.5 | 6 |

TABLE II

| Test No. | Stabilizer combination (according to the invention) | Concentration in percent by weight | Period of embrittlement in days at 140° C. |
|---|---|---|---|
| 13 | 2-hydroxy-4,5-benzo-1,3,2-dioxastibenol. Di-(octydecal)-disulfide | 0.25<br>0.25 | 25 |
| 14 | 2-hydroxy-4,5-benzo-1,3,2-dioxastibenol. Di-(octadecyl)-tetrasulfide | 0.25<br>0.25 | 34 |
| 15 | 2-hydroxy-4,5-benzo-1,3,2-dioxastibenol. Thio-di-(propionic acid lauryl-ester). | 0.25<br>0.25 | 27 |
| 16 | 2-hydroxy-4,5-benzo-8-tert.-butyl-1,3,2-dioxastibenol. Trithio-di-(acetic acid-octadecyl-ester). | 0.25<br>0.25 | 29 |
| 17 | 2-hydroxy-4,5-benzo-6-hydroxy-1,3,2-dioxastibenol. Di-(octadecyl)-disulfide | 0.25<br>0.25 | 33 |
| 18 | 2-hydroxy-4,5-benzo-6-hydroxy-1,3,2-dioxastibenol. Dithio-di-(undecylic acid-butyl-ester). | <br>0.25 | 28 |
| 19 | 2-hydroxy-4,5-benzo-6-hydroxy-8-tert.butyl-1,3,2-dioxastibenol. Tetrathio-di-(acetic acid-dodecyl-ester). | 0.25<br>0.25 | 36 |
| 20 | 2-hydroxy-4,5-benzo-6-hydroxy-8-carboxydodecyl-1,3,2-dioxastibenol. Di-(octadecyl)-disulfide | <br>0.25 | 37 |
| 21 | 2-hydroxy-4,5-benzo-6-hydroxy-8-carboxydodecyl-1,3,2-dioxastibenol. Thio-di-(propionic acid-lauryl-ester). | 0.25<br>0.25 | 31 |
| 22 | 2-hydroxy-4,5-benzo-6-hydroxy-8-carboxydodecyl-1,3,2-dioxastibenol. Dithio-di-(acetic acid-dodecyl-ester). | 0.25<br>0.25 | 32 |

As results from the comparative tests in Table I, the sulfur compounds as well as the antimony compounds separately have only a weak activity. When, however, mixtures of the sulfur and antimony compounds are used according to the invention (tests 13 to 22), the stabilizing period is unexpectedly increased.

I claim:
1. A stabilized polyolefin mixture consisting of a polyolefin containing tertiary carbon atoms and 0.005 to 5% by weight, referred to the polyolefin, of compound (a) having the formula

(a) 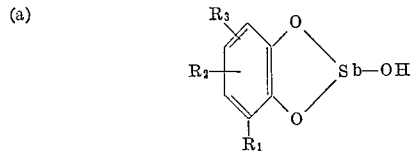

and compound (b) having the formula

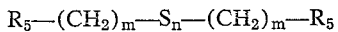

$$R_5-(CH_2)_m-S_n-(CH_2)_m-R_5$$

wherein $R_1$ is hydrogen, chlorine, bromine or hydroxyl, $R_2$ is hydrogen, alkyl having from 1 to 18 carbon atoms, or halogen, $R_3$ is hydrogen, alkyl having from 1 to 5 carbon atoms, or —COO.$R_4$, $R_4$ representing an aliphatic radical having from 1 to 20 carbon atoms, $R_5$ is methyl or —COO.$R_6$, $R_6$ representing alkyl having from 1 to 18 carbon atoms, $n$ is a whole number from 1 to 4 and $m$ is a whole number from 1 to 19 and the ratio of the components (a) and (b) is from 1:9 to 9:1.

2. A mixture as claimed in claim 1, wherein the polyolefin is selected from the group consisting of polypropylene, polybutylene and low-pressure as well as high pressure polyethylene which contain side chains due to side reactions.

3. A mixture as claimed in claim 1, wherein the polyolefin is selected from the group consisting of polypropylene, polybutylene and low-pressure and high-pressure polyethylene containing side chains due to side reactions, compound (a) is selected from the group consisting of:

2-hydroxy-4,5-benzo-1,3,2-dioxastibenol
2-hydroxy-4,5-benzo-8-tert.butyl-1,3,2-dioxastibenol
2-hydroxy-4,5-benzo-6,8-di-tert.butyl-1,3,2-dioxastibenol
2-hydroxy-4,5-benzo-8-chloro-1,3,2-dioxastibenol
2-hydroxy-4,5-benzo-6-hydroxy-1,3,2-dioxastibenol
2-hydroxy-4,5-benzo-7,9-ditert.butyl-1,3,2-dioxastibenol
2-hydroxy-4,5-benzo-6-hydroxy-8-carboxypropyl-1,3,2-dioxastibenol and
2-hydroxy-4,5-benzo-6-hydroxy-8-carboxydodecyl-1,3,2-dioxastibenol and compound (b) is selected from the group consisting of:

di-(octadecyl)-tetrasulfide
di-(octadecyl)-sulfide
di-(dodecyl)-disulfide
di-(octadecyl)-disulfide
di-(octadecyl)-trisulfide
di-(dodecyl)-tetrasulfide
thio-di-(acetic acid dodecyl ester)
thio-di-(propionic acid dodecyl ester)
thio-di-(propionic acid octadecyl ester)
thio-di-(undecylic acid butyl ester)
dithio-di-(acetic acid dodecyl ester)
dithio-di-(propionic acid octyl ester)
dithio-di-(propionic acid dodecyl ester)
dithio-di-(propionic acid octadecyl ester)
dithio-di-(butyric acid dodecyl ester)
dithio-di-(undecylic acid butyl ester)
trithio-di-(acetic acid dodecyl ester)
trithio-di-(propionic acid dodecyl ester)
tetrathio-di-(acetic acid dodecyl ester)
tetrathio-di-(acetic acid octadecyl ester) and
tetrathio-di-(butyric acid octyl ester).

4. A mixture as claimed in claim 1, wherein $R_1$ is hydrogen, chlorine, bromine or hydroxyl, $R_2$ is hydrogen, alkyl having 4 to 9 carbon atoms or halogen, $R_3$ is tert.-butyl or —COO.$R_4$, $R_4$ representing an aliphatic radical having from 12 to 18 carbon atoms, $R_5$ is methyl or —COO.$R_6$, $R_6$ representing an alkyl radical having from 12 to 18 carbon atoms, $n$ is a whole number from 1 to 4 and $m$ is a whole number from 1 to 4.

References Cited

UNITED STATES PATENTS

| 2,488,975 | 11/1949 | Hunter | 260—45.75 |
| 2,581,909 | 1/1952 | Albert et al. | 260—45.75 |
| 2,581,910 | 1/1952 | Albert et al. | 260—45.75 |
| 2,581,911 | 1/1952 | Albert et al. | 200—45.75 |
| 2,686,167 | 8/1954 | Albert | 260—45.75 |
| 3,255,136 | 6/1966 | Hecker et al. | 260—23 |

DONALD E. CZAJA, Primary Examiner

V. P. HOKE, Assistant Examiner

U.S. Cl. X.R.

260—45